US007194250B2

(12) United States Patent
Lim et al.

(10) Patent No.: US 7,194,250 B2
(45) Date of Patent: Mar. 20, 2007

(54) METHOD OF PROVIDING CREDIT CARD CALLING SERVICE BASED ON CAMEL IN UMTS

(75) Inventors: Sun Hwan Lim, Daejeon (KR); Dong Man Jang, Daejeon (KR); Dae Ung Kim, Daejeon (KR)

(73) Assignees: Electronics and Telecommunications Research Institute (KR); KT Corporation (KR)

( * ) Notice: Subject to any disclaimer, the term of this patent is extended or adjusted under 35 U.S.C. 154(b) by 129 days.

(21) Appl. No.: 10/892,039

(22) Filed: Jul. 14, 2004

(65) Prior Publication Data
US 2005/0113065 A1 May 26, 2005

(30) Foreign Application Priority Data
Nov. 26, 2003 (KR) .................. 10-2003-0084707

(51) Int. Cl.
*H04M 11/00* (2006.01)
(52) U.S. Cl. ..................................... 455/406
(58) Field of Classification Search .............. 455/406, 455/407, 445
See application file for complete search history.

(56) References Cited
U.S. PATENT DOCUMENTS
6,036,090 A * 3/2000 Rahman et al. ............. 235/380

| 6,405,028 | B1 * | 6/2002 | DePaola et al. ............. 455/406 |
| 6,505,163 | B1 * | 1/2003 | Zhang et al. ................ 704/275 |
| 2002/0068591 | A1 * | 6/2002 | Uskela ........................ 455/466 |
| 2003/0152039 | A1 * | 8/2003 | Roberts ....................... 370/255 |
| 2003/0158812 | A1 * | 8/2003 | Engelhart .................... 705/39 |
| 2004/0243490 | A1 * | 12/2004 | Murto et al. ................. 705/30 |

FOREIGN PATENT DOCUMENTS
KR  1020030049655  6/2003
KR  1020030056329  7/2003

OTHER PUBLICATIONS
IMT-2000 Visitor Location Register, Y. Lee, et al., pp. 507-515.

* cited by examiner

*Primary Examiner*—Lester G. Kincaid
*Assistant Examiner*—Gary Au
(74) *Attorney, Agent, or Firm*—Blakely Sokoloff Taylor & Zafman

(57) ABSTRACT

Provided is a method of providing a Credit Card Calling (CCC) service in a Customized Applications for Mobile networks Enhanced Logic (CAMEL)-based Universal Mobile Telecommunications System (UMTS). The method defines a method of controlling the CCC service that has not yet been defined in the existing UMTS CAMEL structure. Accordingly, it is possible to provide CCC service users with more differentiated, various features of the CCC service.

4 Claims, 15 Drawing Sheets

METHOD OF PROVIDING CREDIT CARD CALLING SERVICE BASED ON CAMEL IN UMTS

BACKGROUND OF THE INVENTION

This application claims the priority of Korean Patent Application No. 2003-84707 filed on Nov. 26, 2003 in the Korean Intellectual Property Office, the disclosure of which is incorporated herein in its entirety by reference.

1. Field of the Invention

The present invention relates to a method of providing a billing service for a mobile telecommunication system, and more particularly, to a post-paid billing service for a Universal Mobile Telecommunication System (UMTS).

2. Description of the Related Art

In the 1970's, free phone service, which is distinguished from switchboard-based supplementary services, was first launched in the USA. The free phone service is provided from a server installed outside a switchboard via a common line signal network, using call routing. In the 1980's, the free phone service was generalized using a network architecture that provides various services. The network architecture is referred to as an Intelligent Network (IN).

As a variety of first-generation analog mobile telecommunication networks have been digitized into second-generation networks, telecommunication modes are largely categorized into the Global System for Mobile communications (GSM) network according to the European Telecommunications Standards Institute (ETSI) standards and the Industrial Standard-41 (IS-41) network according to the US Telecommunications Industry Association (TIA) standards. Similarly, telecommunication modes of the third-generation networks are categorized into the European telecommunication mode based on Wideband-Code Division Multiple Access (UMTS/W-CDMA) and the US telecommunication mode based on Code Division Multiple Access (CDMA)-2000.

In the UMTS/W CDMA-based European telecommunication mode, an IN of a telecommunication network is standardized according to the Customized Applications for Mobile networks Enhanced Logic (hereinafter referred to as "CAMEL") standard that is a version fit for the existing IN. In the CDMA-2000 based US telecommunication mode, an IN is standardized according to the Wireless Intelligent Network (WIN) standard related to individual services.

In the GSM/UMTS, supplementary services available from all roaming networks are standardized. However, competitive mobile communication providers have been tried to provide their own services in addition to the standard supplementary services. Such a situation is, however, not coincident with a standard network architecture aiming at providing global services. Accordingly, there is a need to establish a Virtual Home Environment (VHE) in which not only a basic service providing platform can be standardized but also mobile communication providers can develop individual services, so that mobile subscribers can easily move from one network to another network and receive a service, which is equivalent to that from a home network, from a network where he/she visits.

Several toolkits are defined in a GSM Phase 2+ version, and one of the toolkits is the CAMEL that provides user-defined intellectual services. Accordingly, the CAMEL is considered as a representative common service platform that can provide Operator Specific Service (OSS).

However, although the CAMEL available provides complicated and various OSS such as a Credit Card Calling (CCC) service, it does not suggest a method and process of easily making a new OSS. Accordingly, standards for details of a process for a user to access a network that provides a new OSS are required.

SUMMARY OF THE INVENTION

The present invention provides a method of easily providing a complicated and various Operator Specific Service (OSS), such as CAMEL-based Credit Card Calling (CCC) service, in a Universe Mobile Telecommunication System (UMTS) that supports standards of the third-generation telecommunication network.

According to one aspect of the present invention, there is provided a method of providing a credit card calling (CCC) service in a customized applications for mobile networks enhanced logic (CAMEL)-based universal mobile telecommunication system, the method comprising (a) receiving a personal identification number (PIN) entered by a CCC service user who holds an activated credit card and determining whether the entered PIN is valid; (b) when it is determined in (a) that the entered PIN is invalid, determining whether the PIN is valid within a range of a predetermined number of times; (c) when it is determined in (a) or (b) that the entered PIN is valid, receiving a destination number from the CCC service user and determining whether the destination number is valid; (d) when it is determined in (c) that the destination number, determining whether the destination number is valid within a range of a predetermined number of times; (e) when it is determined in (c) or (d) that the destination number is valid, establishing a call; and (f) when the CCC service user or a called party disconnects the call after call establishment, billing the CCC service user for the CCC service.

According to another aspect of the present invention, there is provided a method of providing a credit card calling (CCC) service in a customized applications for mobile networks enhanced logic (CAMEL)-based universal mobile telecommunication system, the method comprising (a) a service switching function (SSF) receiving a service access code (SAC) and a credit card number (CCN) dialed by a CCC service user and sending an initial detection operation InitialDP to a global system for mobile communication (GSM) Service Control Function (gsmSCF); (b) a new dialogue initiates and a service logic program instance (SLPI) is invoked; (c) the SLPI requesting a connection between the gsmSCF and a specialized resource function (SRF); (d) the SLPI receiving a personal identification number (PIN) from the SRF; (e) the SLPI sending a search operation to a credit card issuer's database so as to receive information regarding whether the PIN is valid; (f) when the PIN is determined to be valid as a result of searching of the credit card issuer's database, the SLPI receiving a destination number from the SRF; (g) the SLPI requesting the SSF to send a report regarding a Basic Call State Model (BCSM) event; (h) the SSF arming event detection points (EDPs) in response to the request for the report regarding the BCSM event; (i) the SLPI requesting the SSF to disconnect a connection to the SRF in response to the arming of the EDPs; (j) the SLPI requesting the CCC service user who holds the destination number to make a call connection; and (k) when the SSF arms the EDPs indicating that a connection to the CCC service user or a called party is disconnected, the SLPI requesting the SSF to bill the CCC service user for the CCC service.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

CAMEL is a combination of an Intelligent Network (IN) developed from Global System for Mobile Communication Phase 2+ (GSM Phase 2+) and a mobile network, and provides a global environment that allows an Operator Specific Service (OSS). CAMEL provides CAMEL features that can provide services, independently from a service-providing network. The CAMEL features are network features, not supplementary services. To provide the OSS service, a mechanism for the CAMEL features requires exchange of information among a Visited Public Land Mobile Network (VPLMN), a Home Public Land Mobile Network (HPLMN), and a CAMEL Service Environment (CSE). The HPLMN represents a tool that can provide the OSS service to a mobile subscriber even during roaming.

The present invention suggests a method of controlling the third-generation Universal Mobile Telecommunication System (3G UMTS) to provide a CAMEL-based Credit Card Calling (CCC) service. The CCC service represents a post-paid billing communication service that allows a credit card user who holds a local/global credit card to make an overseas call or a local near-distance or long-distance call via a CCC service provide's network and pay a calling bill from a his/her card account later. A process of or an algorithm for connecting a physical body and functional body of a UMTS network, according to the present invention, will now be described.

Figure 1:
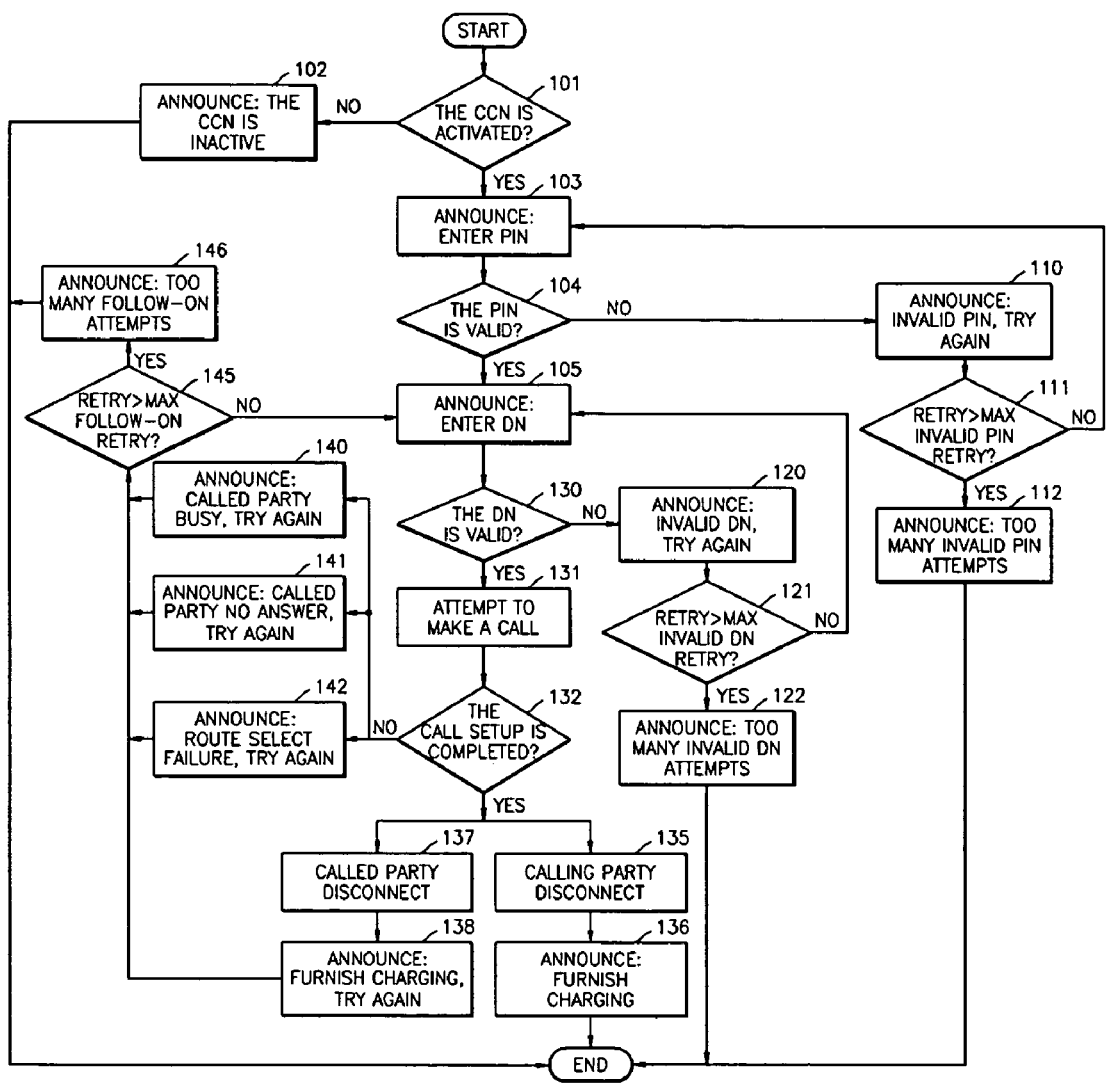
FIG. 1 is a flowchart illustrating user's interface for providing a Credit Card Calling (CCC) service in a Universal Mobile Telecommunication System (UMTS)-based CAMEL structure, according to an embodiment of the present invention.

FIG. 1 is a flowchart illustrating user's interface for providing a CCC service in a UMTS CAMEL structure, according to an embodiment of the present invention. Registration of the CCC service is made on offline interactions, being associated with a commercial credit card service that requires strict security. Activation of a credit card is made simultaneously with registration thereof, according to characteristics of the CCC service.

In the method, referring to FIG. 1, whether a credit card number (CCN) is activated is determined before implementing user's interface for the CCC service in the UMTS CAMEL structure (step 101).

If it is determined in step 101 that the CCN is not activated, this fact is announced and the method ends (step 102). However, when it is determined in step 101 that the CCN is activated, a user is informed that a personal identification number (PIN) shall be entered and enters his/her PIN (step 103).

Next, whether the entered PIN is valid is determined (step 104). If it is determined in step 104 that the entered PIN is not valid, entering of a valid PIN shall be retried is announced (step 110). Next, whether a retry number of times to enter an invalid PIN, is larger than a maximum allowed number of times to enter an invalid PIN is determined (step 111). If it is determined in step 111 that the retry number is larger than the maximum allowed number, an announcement that that the PIN was entered excessively is made and the method ends (step 112). If it is determined in step 111 that the retry number is smaller than the maximum allowed number, the method returns to step 103 and the user reenters the PIN.

Then, if it is determined in step 104 that the entered PIN is valid, an announcement that a destination number (DN) shall be entered is made and the user enters his/her DN (step 105). Next, whether the entered DN is valid is determined (step 130).

If it is determined in step 130 that the entered DN is invalid, an announcement that the entered DN is invalid and entering of the DN shall be retried is made (step 120). Next, whether a retry number of times to enter an invalid DN is larger than a maximum allowed number of times to enter an invalid DN is determined (step 121). If it is determined in step 121 that the retry number is larger than the maximum allowed number, an announcement that the DN was entered excessively is made and the method ends (step 122). However, if it is determined in step 121 that the retry number is smaller than the maximum allowed number, the method returns to step 105 and the users reenters the DN.

If it is determined in step 130 that the entered DN is valid, a calling is attempted (step 131), and whether a call setup is completed is determined (step 132). When it is determined in step 132 that a calling party disconnects the call after the call connection (step 135), connection to a called party is terminated, the user is informed that a fee for services provided will be charged, and the method ends (step 136). When it is determined in step 132 that the called party disconnects the call after the call connection (step 137), the user is given a message that connection to the CCC service must be retried since a fee for services provided is being charged (step 138).

After step 138, it is determined whether a retry number of times to make a call is larger than a maximum allowed number of times to make a call (step 145). If it is determined in step 145 that the retry number is larger than the maximum allowed number, the user is informed that making a call is excessively attempted and the method ends (step 146). If it is determined in step 145 that the retry number is smaller than the maximum allowed number, the method returns to step 105 and the DN is entered again.

However, when it is determined in step 132 that the call connection is not completed, an announcement that a call must be made again since a called party is busy on the telephone (step 140), that a call must be made again since the called party does not respond to the call (step 141), or that a call must be made again since the called party is not present in a receiving area (step 142) is made. Next, the method returns to step 145 and it is determined whether the retry number is larger than the maximum allowed number.

As described above, a CCC service user makes a call by dialing a Service Access Code (SAC) and a CCN without requesting a specific interface. When an announcement that the CCN is verified to be valid and a user's PIN shall be entered is made, the user enters his/her PIN. If the entered PIN is determined to be valid, the user enters his/her DN in response to an announcement that a user's DN shall be entered.

Various types of service data are required to perform the CCC service and must be defined upon providing the CCC service.

Table 1 shows a service data description used when the CCC service according to the present invention is provided and Table 2 shows trigger specifications according to the present invention.

TABLE 1

| Description Name | Value Range/Format |
| --- | --- |
| IpRouting Address | Called Party Number |
| Max Invalid PIN Retry | 3 |
| Max Follow-On Retry | 3 or 1000 |
| Max Invalid DN Retry | 3 or 1000 |
| Nbr of CCN Digits | 19 (Max) |
| Nbr of PIN Digits | 4 |

TABLE 2

| Classification | N-CSI |
| --- | --- |
| Originating/Terminating Trigger | Originating |
| Trigger Detection Point(TDP) | Collected_Info |
| TDP Provisional As | TDP-R |
| Category | Subscriber Based |
| Resultant Operation | InitialDP |

The trigger specifications specified in Table 2 describe conditions of starting the service. When the CCC service user, i.e., the calling party, dials the SAC and the CCN to make a call and presses the PIN and the DN, the CCC service is started.

FIGS. 2 through 5 illustrate flows of network messages exchanged in a network system that provides a UMTS CAMEL-based CCC service, according to an embodiment of the present invention.

Figure 2:
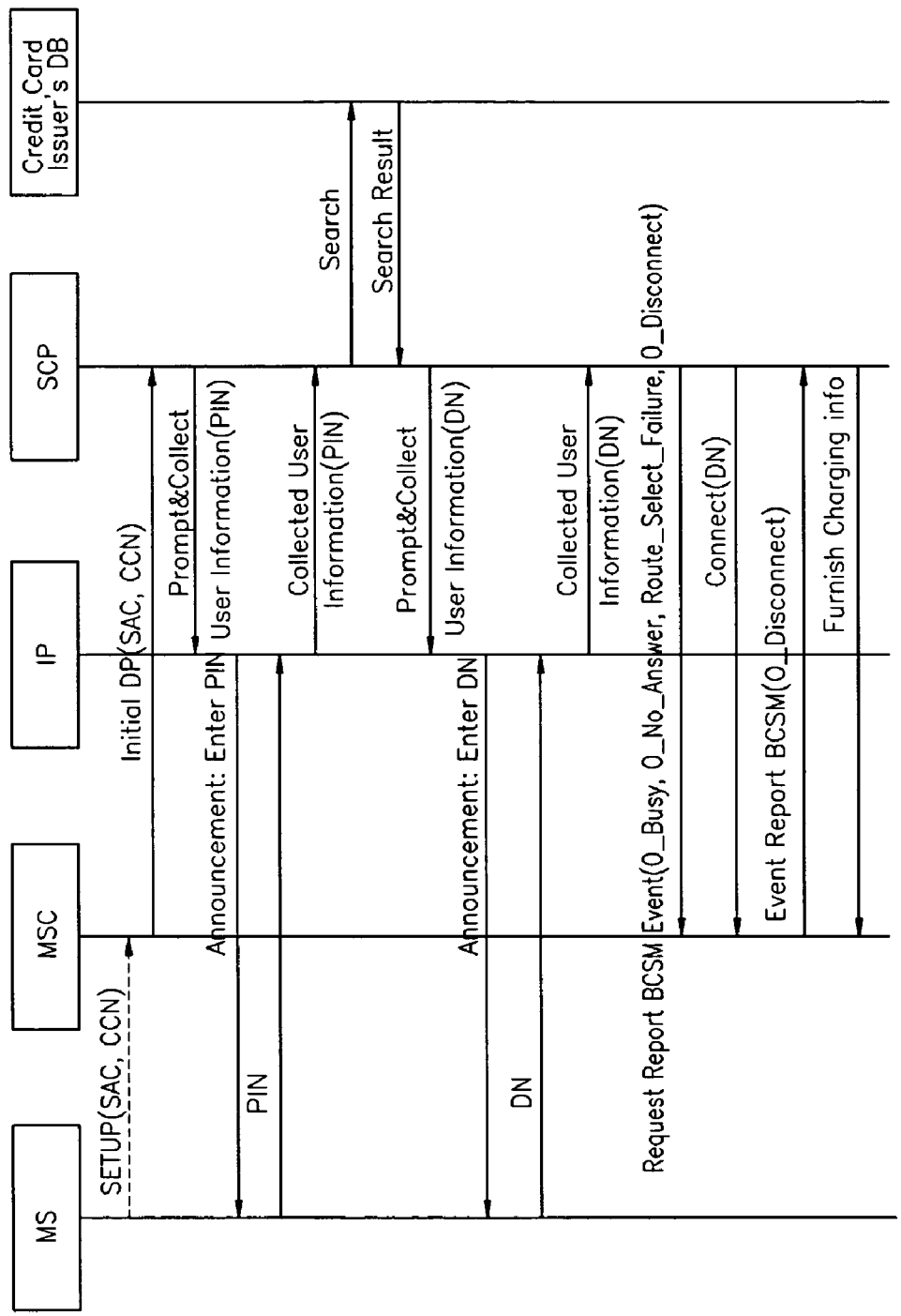
FIGS. 2 through 5 illustrate flows of network messages exchanged in a network system that provides a UMTS CAMEL-based CCC service, according to embodiments of the present invention.

More specifically, FIG. 2 illustrates a flow of network messages exchanged when a CCC service user successfully accesses the CCC service, is identified, and connected to the CCC service. In other words, FIG. 2 illustrates a flow of information exchanged among network systems while the CCC service is performed, i.e., until a call connection is completed after successful access and identification.

Referring to FIG. 2, when a mobile station (MS) accessed by the CCC service user provides the SAC and CCN of the user to a Mobile Switching Center (MSC), the MSC transmits an initial detection operation InitialDP to a Service Control Point (SCP) in order to verify whether the CCN is valid or not. In the initial detection operation InitialDP, the SAC and CCN of the CCC service user are checked.

When the CCN is verified, the SCP requests the CCC service user to submit his/her Personal Identification Number (PIN) via an Intelligent Peripheral (IP), and the CCC service user enters his/her PIN pursuant to the request. The entered PIN is input to the SCP via the IP, and the SCP searches for a credit card issuer's database (DB) for the identity of the CCC service user. Next, when the entered PIN is determined to be valid, the SCP requests the CCC service user to submit his/her DN via the IP. When the CCC service user inputs his/her DN upon the request, the CCC service user is provided with the CCC service.

Figure 3:
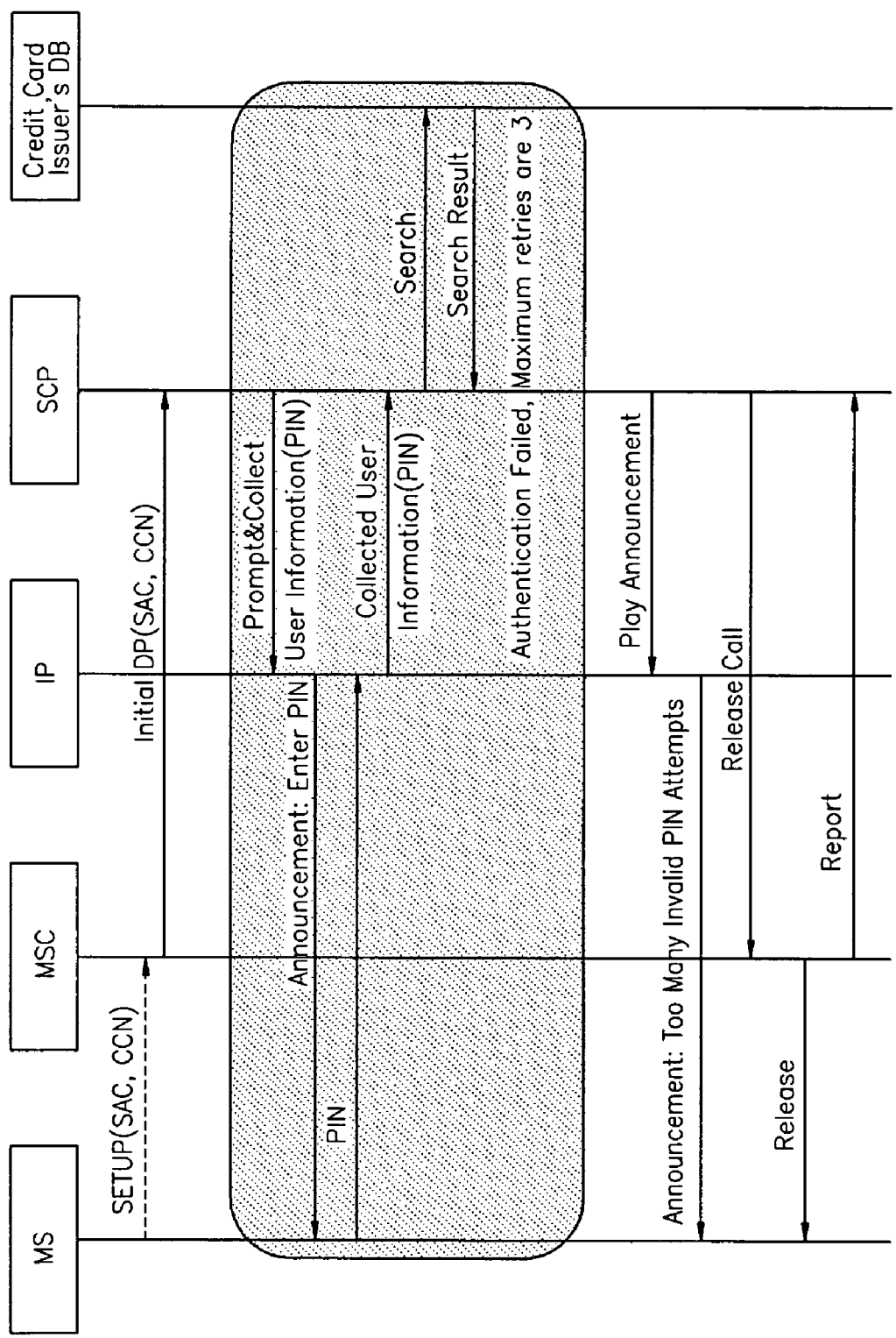

FIG. 3 illustrates a flow of network messages exchanged during which authentication for a PIN entered by a CCC service user is rejected and a request to reenter a valid PIN is made. A shaded portion of FIG. 3 indicates that a CCC service will be terminated, when authentication for an PIN entered by the CCC service user fails and a retry number of times to enter an invalid PIN exceeds a maximum allowed number of times, e.g., 3, to enter an invalid PIN (Max Invalid PIN Retry) (see Table 1).

Figure 4:
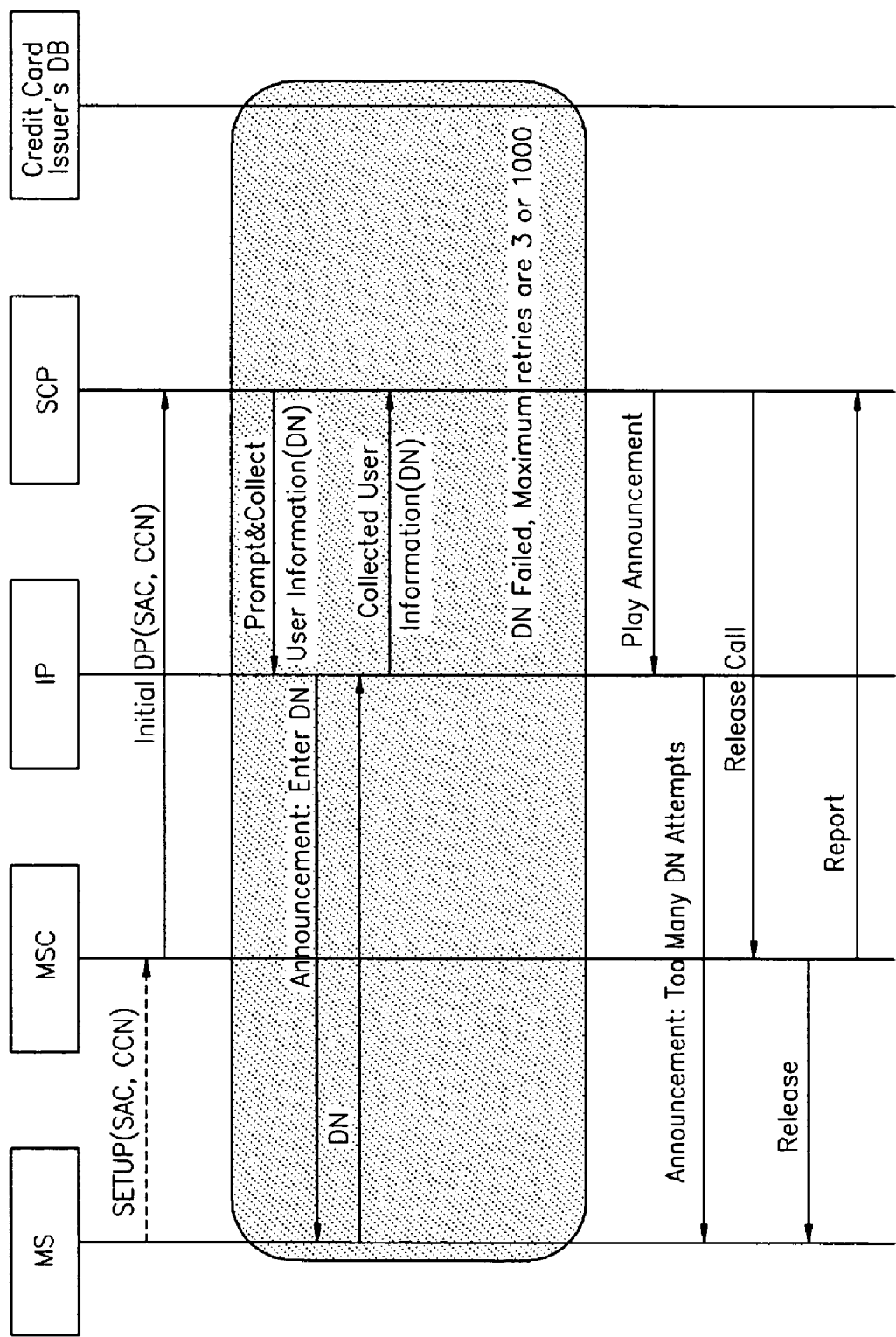

FIG. 4 illustrates a flow of network messages exchanged during which authentication for a DN entered by a CCC service user is rejected and a valid DN is reentered. A shaded portion of FIG. 4 indicates that a CCC service will be terminated, when the DN entered by the CCC service user is not authenticated after the PIN entered was successfully authenticated and a retry number of times to enter an invalid DN exceeds a maximum allowed number of times, e.g., 3 or 1000, to enter an invalid DN (Max Invalid DN Retry) (see Table 1).

Figure 5:
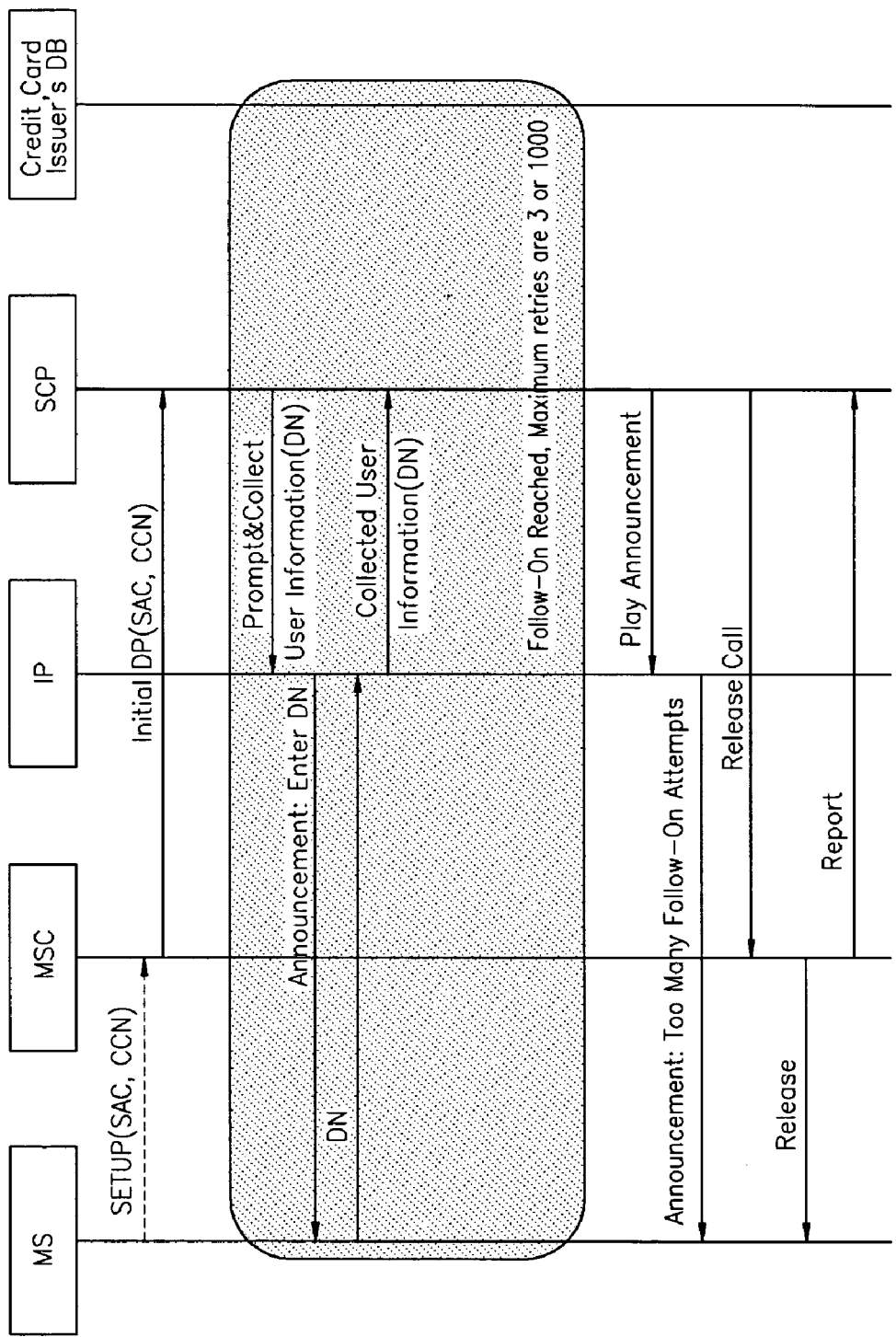

FIG. 5 illustrates a flow of network messages exchanged until a retry number of follow-on calls reaches a maximum allowed number of follow-on calls. A shaded portion of FIG. 5 indicates that a CCC service will be terminated when the retry number reaches or exceeds the maximum allowed number, e.g., 3 or 1000, (see Table 1) after a PIN and a DN entered by the CCC service user were authenticated.

In the case of follow-on calls, a process of reentering the DN is performed again and follow-on calls are made after the DN is determined to be valid. The follow-on calls are retried until the retry number reaches the maximum allowed number.

Results of a follow-on call are classified into four cases where a called party is busy on the telephone (O_Busy), the called party does not answer to the call (O_No_Answer), a call connection fails (Route_Select_Failure), and a connection between a calling party and a called party is terminated (O_Disconnect).

FIGS. 6 through 15 illustrate flows of service messages exchanged in a network system that provides a UMTS CAMEL-based CCC service, according to embodiments of the present invention.

Figure 6:
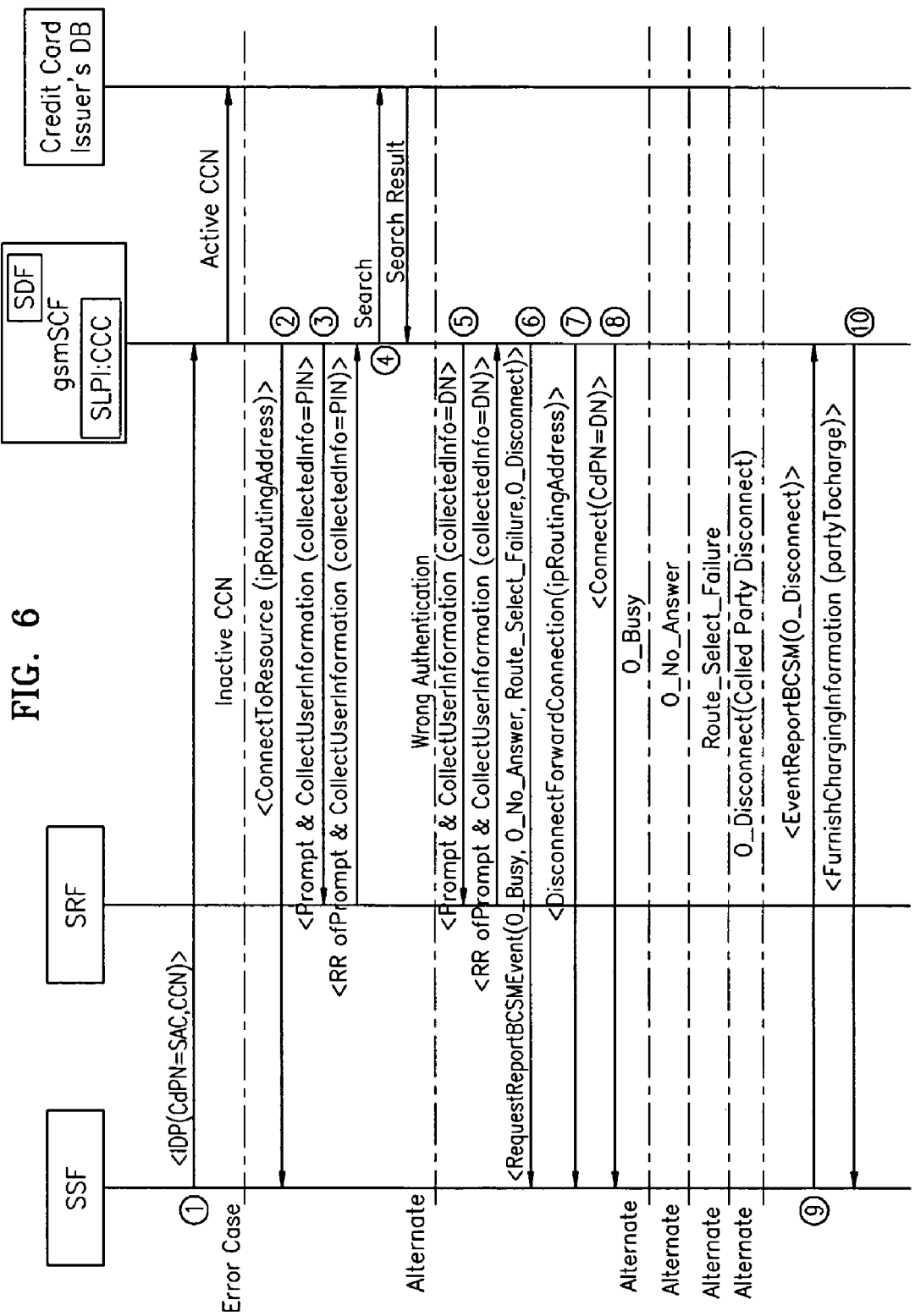
FIGS. 6 through 15 illustrate flows of service messages exchanged in a network system that provides a UMTS CAMEL-based CCC service, according to embodiments of the present invention.

More specifically, FIG. 6 illustrates a flow of service messages exchanged during a Service Switching Function (SSF) and a GSM Service Control Function (gsmSCF). Referring to FIG. 6, when a CCC service user dials his/her SAC and CCN, the SSF transmits an initial detection operation InitialDP to the gsmSCF and waits for a result of transmission, indicated by an arrow ①. After the transmission, a new dialogue initiates and a Service Logic Program Instance (SLPI) is invoked. Next, the SLPI requests a connection between the gsmSCF and a Specialized Resource Function (SRF), indicated by an arrow an arrow ②. Next, the SLPI sends the SRF a request that a PIN of the CCC service user shall be input, and the SRF sends the PIN to the SLPI upon the request, indicated by an arrow ③. Next, the SLPI sends a search operation to a credit card issuer's DB so as to receive information regarding whether the PIN is valid, and receives a result of search from the credit card issuer's DB, indicated by an arrow ④. When the PIN is verified, the SLPI sends the SRF a message that a DN of the CCC service user shall be entered, and receives the DN entered from the SRF, indicated by an arrow ⑤.

The SLPI requests the SSF to submit a report regarding a Basic Call State Model (BCSM) Event, indicated by an arrow ⑥. The BCSM Event includes four cases where a called party is busy on the telephone (O_Busy), the called party does not answer to the call (O_No_Answer), a call connection fails (Route_Select_Failure), and a connection between a calling party and a called party is terminated (O_Disconnect).

The SSF arms Event Detection Points (EDPs) and the SLPI requests the SSF to disconnect a connection to the SRF, indicated by an arrow ⑦. Next, the SLPI requests the CCC service user who holds a destination number to make a call connection, indicated by an arrow ⑧. The SSF arms EDPs (O_Disconnect), indicated by an arrow ⑨ and the SLPI requests the SSF to bill the CCC service user for the CCC service, indicated by an arrow ⑩.

Figure 7:
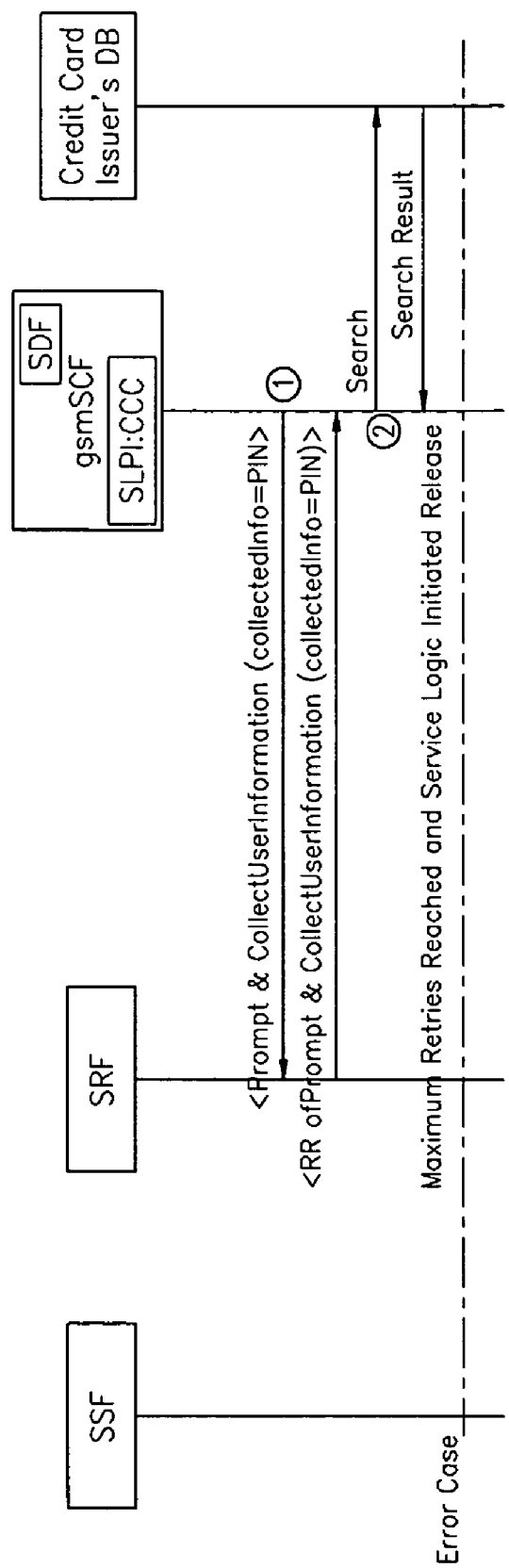

FIG. 7 illustrates a flow of messages exchanged between an SSF and a gsmSCF for wrong authentication. Referring to FIG. 7, the SLPI sends the SRF a message that a PIN of a CCC service user shall be entered, and the SRF transmits the PIN to the SLPI in response to the message, indicated by an arrow ①. Next, the SLPI sends a search operation to a credit card issuer's DB so as to receive information regarding whether the PIN is valid or not, and receives a result of search from the credit card issuer's DB, indicated by an arrow ②. When the result of search reveals that the PIN is invalid, it is determined that an error occurs during verification of the PIN.

Figure 8:
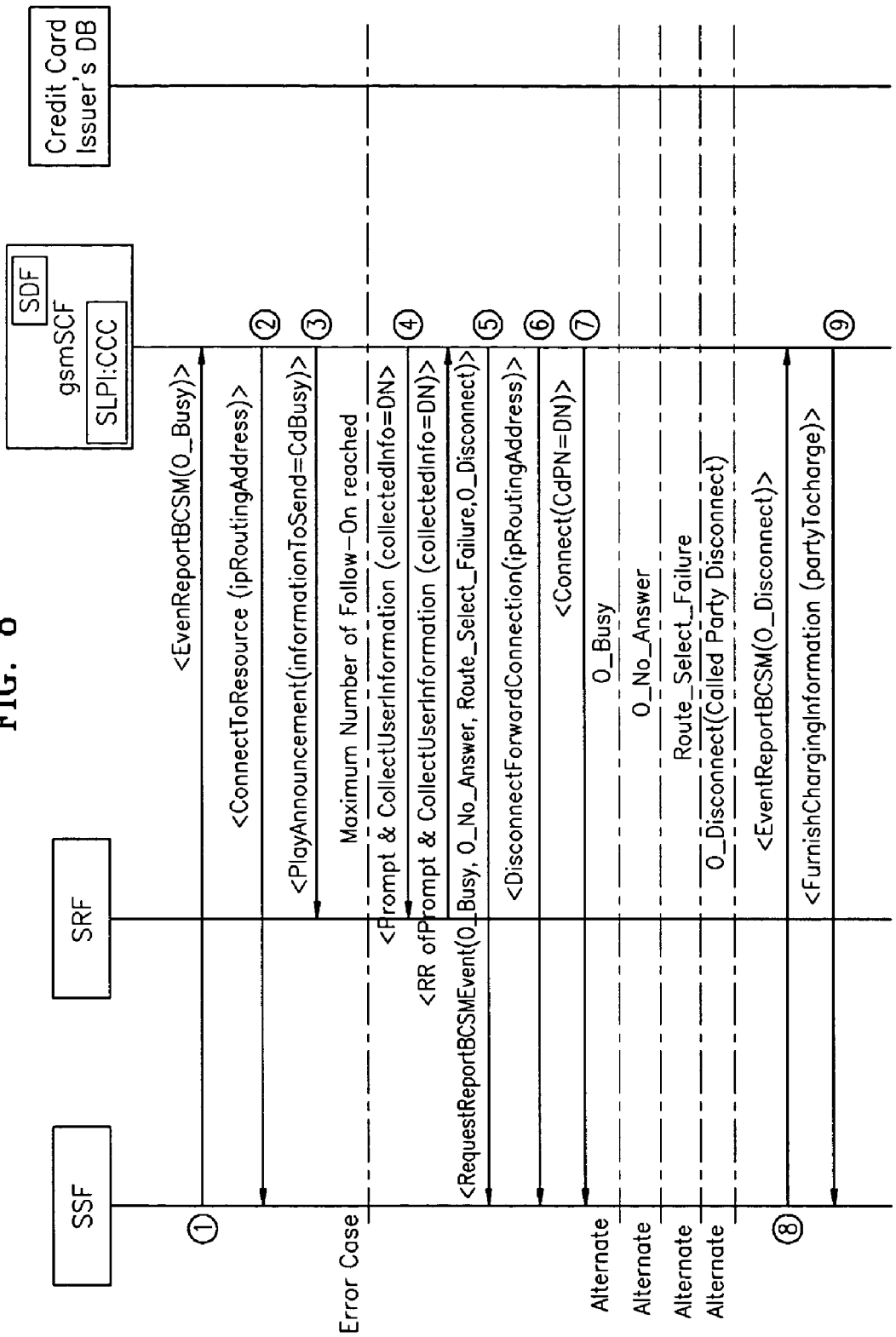

FIG. 8 illustrates a flow of messages exchanged between an SSF and a gsmSCF during follow-on calls when a called party for a CCC service is busy on the telephone. Referring to FIG. 8, an SLPI receives from the SSF a report regarding a BCSM Event (O_Busy) that indicates the called party is busy on the telephone, indicated by an arrow ①, and requests a connection between the gsmSCF and the SRF, indicated by an arrow ②. Then, the SLPI gives the SRF an announcement that the called party is busy on the telephone (Busy), indicated by an arrow ③. Next, the SLPI sends the SRF a message that a DN of a CCC service user shall be entered, and the SRF sends the DN to the SLPI in response to the message, indicated by an arrow ④.

Next, the SLPI requests the SSF to submit a report regarding a BCSM event and the SSF arms EDPs, indicated by an arrow ⑤. The BCSM event includes four cases where a called party is busy on the telephone (O_Busy), the called party does not answer (O_No_Answer), a call connection fails (Route_Select_Failure), and a connection between a calling party and a called party is terminated (O_Disconnect).

Thereafter, the SLPI requests the SSF to disconnect a connection to the SRF, indicated by an arrow ⑥, and the SLPI requests the CCC service user holding a destination number to make a call connection, indicated by an arrow ⑦. Next, the SSF arms EDPs (O_Disconnect), indicated by an arrow ⑧, and the SLPI request the SSF to bill the CCC service user for the CCC service, indicated by an arrow ⑨.

Figure 9:
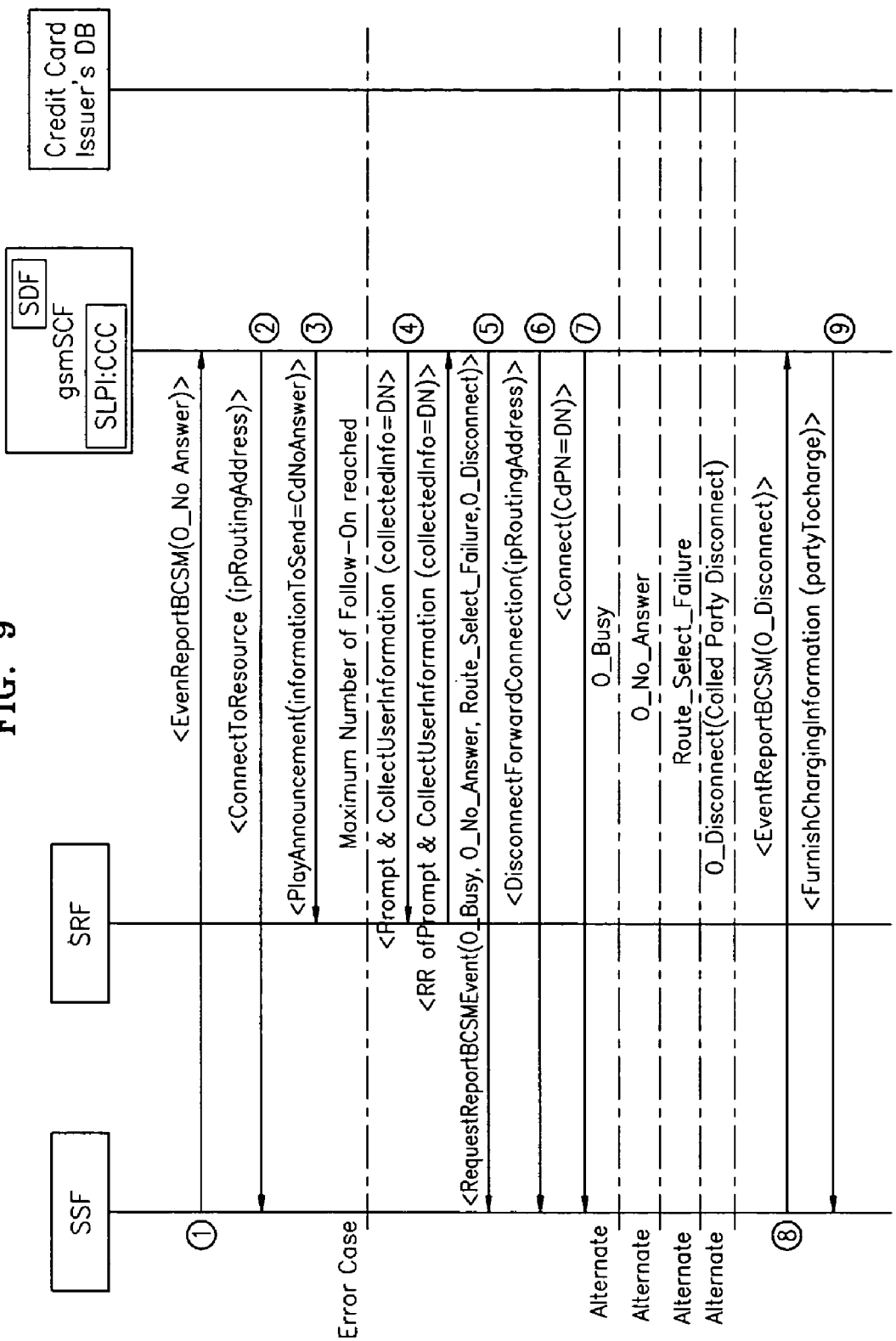

FIG. 9 illustrates a flow of messages exchanged between an SSF and gsmSCF during follow-on calls when a called party for a CCC service does not answer. Referring to FIG. 9, an SLPI receives from the SSF a report regarding a BCSM event (O_No_Answer) indicating the called party does not answer, indicated by an arrow ① and requests a connection between the gsmSCF and the SRF, indicated by an arrow ②. Then, the SLPI gives the SRF an announcement that the called party does not answer, indicated by an arrow ③.

Next, the SLPI sends the SRF a message that a DN of a CCC service user shall be entered and the SRF transmits the DN to the SLPI in response to the message, indicated by an arrow ④. Then, the SLPI requests the SSF to submit a report regarding a BCSM event and the SSF arms EDPs, indicated by an arrow ⑤.

Thereafter, the SLPI requests the SSF to disconnect a connection to the SRF, indicated by an arrow ⑥, and the SLPI requests the CCC service user holding a destination number to make a call connection, indicated by an arrow ⑦. Next, the SSF arms EDPs (O_Disconnect), indicated by an arrow ⑧, and the SLPI request thee SSF to bill the CCC service user for the CCC service, indicated by an arrow ⑨.

Figure 10:
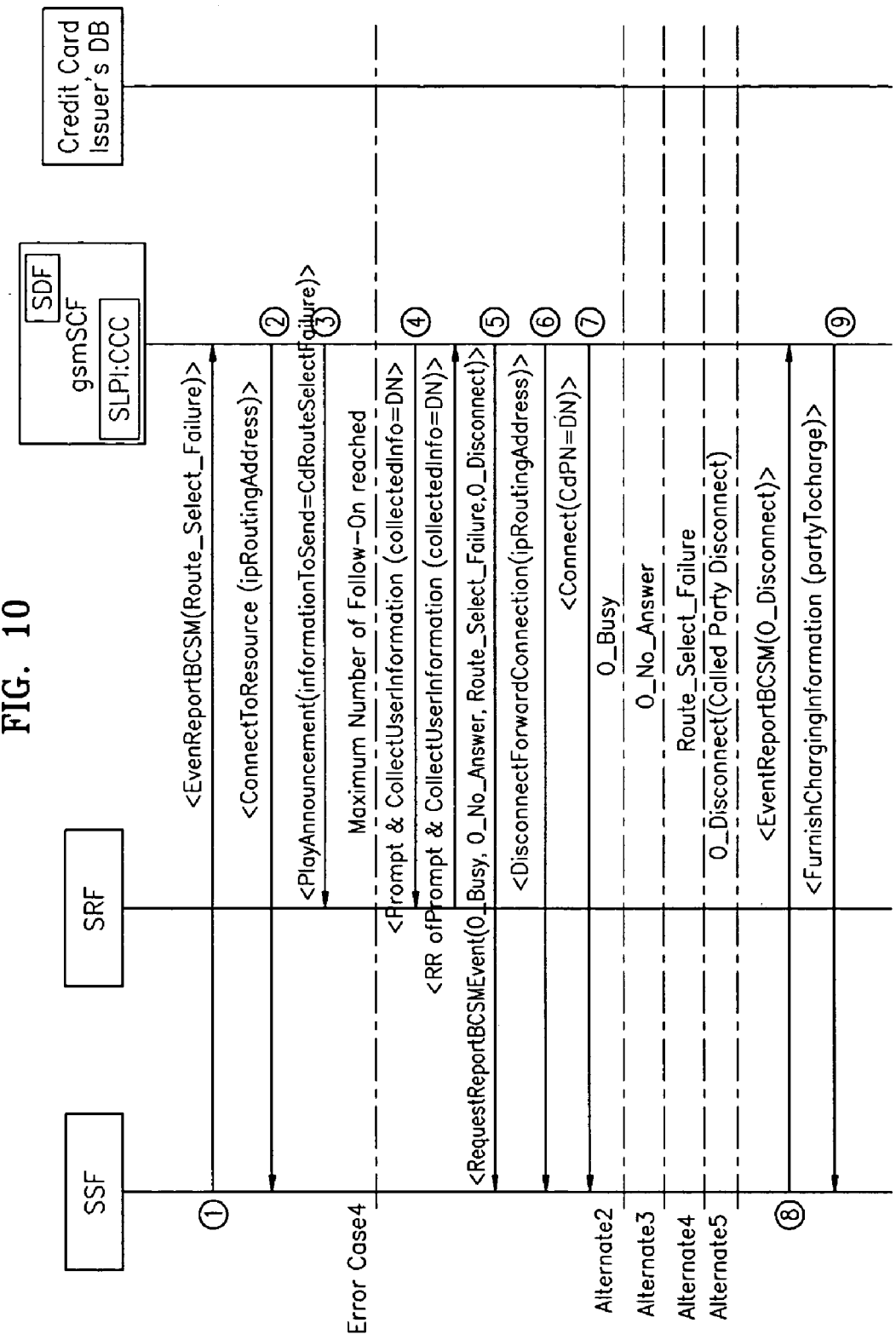

FIG. 10 illustrates a flow of messages exchanged between an SSF and a gsmSCF during follow-on calls when a called party is not present in a receiving area. Referring to FIG. 10, the SLPI receives from the SSF a report regarding a BCSM event that the called party is not positioned in the receiving area (O_Route_Select_Failure), indicated by an arrow ①, and requests a connection between the gsmSCF and the SRF, indicated by an arrow ②. Next, the SLPI gives the SRF an announcement that route selection fails since the called party is not located in the receiving area (Route_Select_Failure), indicated by an arrow ③.

Thereafter, the SLPI sends the SRF a message that a DN of a CCC service user shall be entered, and the SRF enters the DN and provides the entered DN to the SLPI, indicated by an arrow ④. Next, the SLPI requests to receive a report regarding a BCSM event and the SSF arms EDPs, indicated by an arrow ⑤.

Next, the SLPI requests the SSF to disconnect a connection to the SRF, indicated by an arrow ⑥ and a CCC service user holding a destination number to make a call connection, indicated by an arrow ⑦. Next, the SSF arms EDPs (O_Disconnect), indicated by an arrow ⑧, and the SLPI requests the SSF to bill the CCC service user for the CCC service, indicated by an arrow ⑨.

Figure 11:
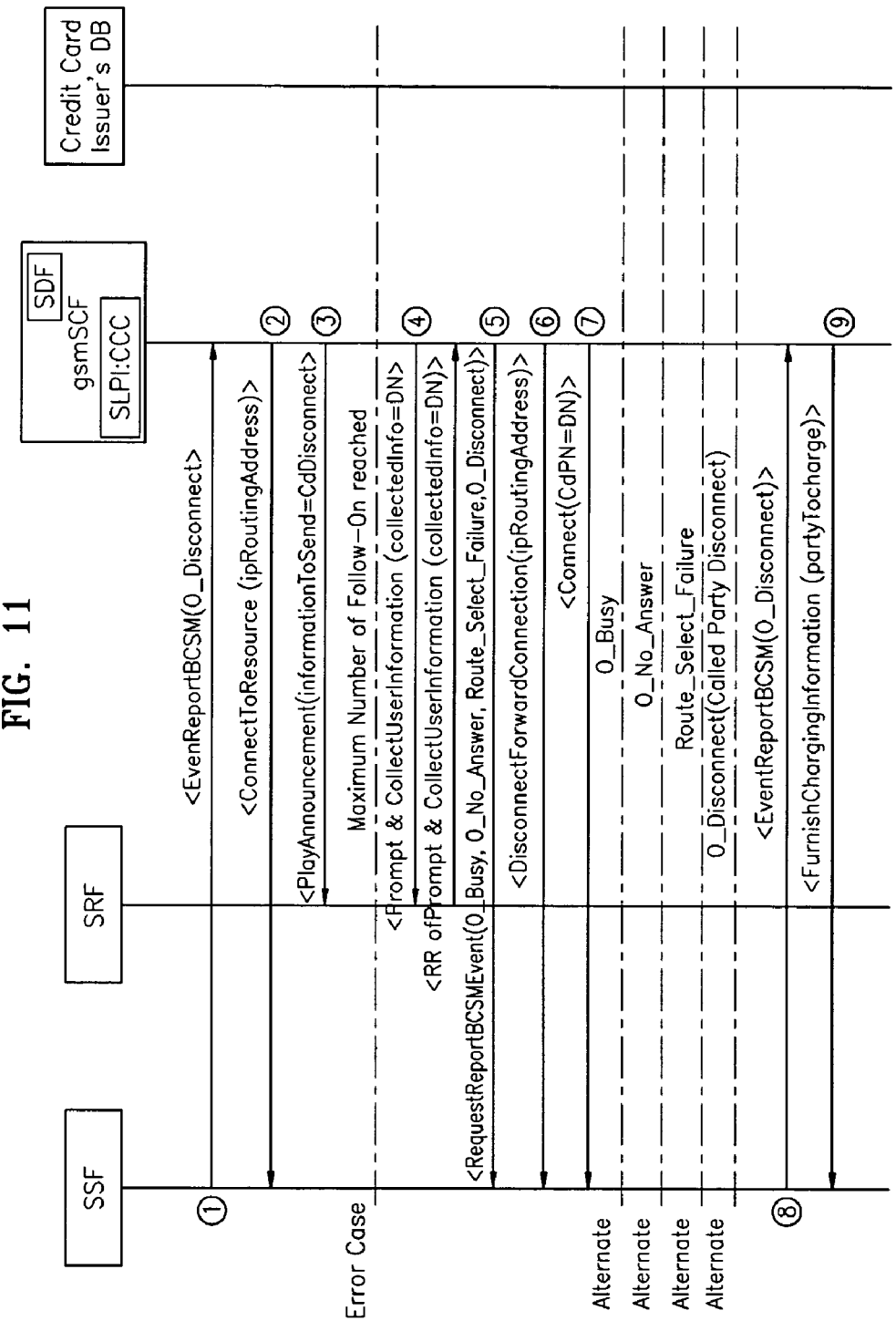

FIG. 11 illustrates a flow of messages exchanged between an SSF and a gsmSCF during follow-on calls when a called party for a CCC service disconnects a call connection. Referring to FIG. 11, an SLPI receives a report from the SSF a BCSM event indicating that a connection to the called party is disconnected (O_Disconnect), indicated by an arrow ①, and requests a connection between the gsmSCF and the SRF to be disconnected, indicated by an arrow ②. Next, the SLPI gives the SRF an announcement that the connection to the called party is disconnected, indicated by an arrow ③.

Next, the SLPI sends the SRF a message that a DN of a CCC service user shall be entered, and the SRF enters the DN and provides the entered DN to the SLPI, indicated by an arrow ④. Next, the SLPI requests to receive a report regarding a BCSM event and the SSF arms EDPs, indicated by an arrow ⑤.

Thereafter, the SLPI requests the SSF to disconnect a connection to the SRF, indicated by an arrow ⑥, and the SLPI requests the CCC service user holding a destination number to make a call connection, indicated by an arrow ⑦. Then, the SSF arms EDPs (O_Disconnect), indicated by an arrow ⑧, and the SLPI requests the SSF to bill the CCC service user for the CCC service, indicated by an arrow ⑨.

Figure 12:
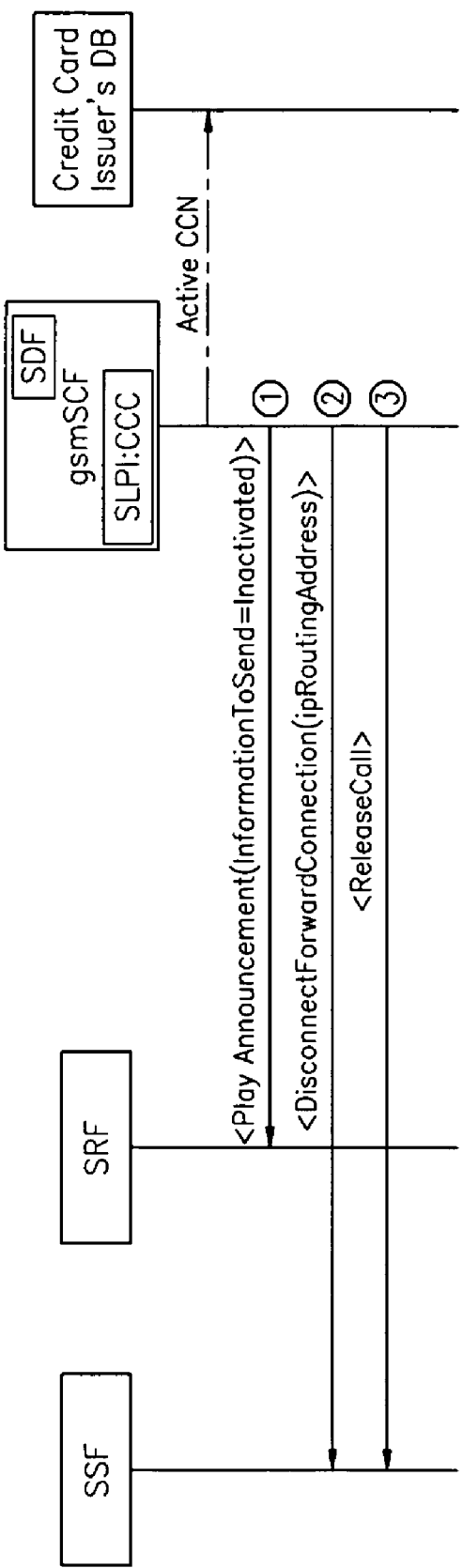

FIG. 12 illustrates a flow of messages exchanged between an SSF and a gsmSCF when a CCN is inactivated. Referring to FIG. 12, the SLPI gives an SRF, i.e., a CCC service user, an announcement that the CCN is inactivated, indicated by an arrow ①. Then, the SLPI request the SSF to disconnect a connection to the SRF, indicated by an arrow ②, and sends the SSF a ReleaseCall operation so as to terminate the CCC service, indicated by an arrow ③.

Figure 13:
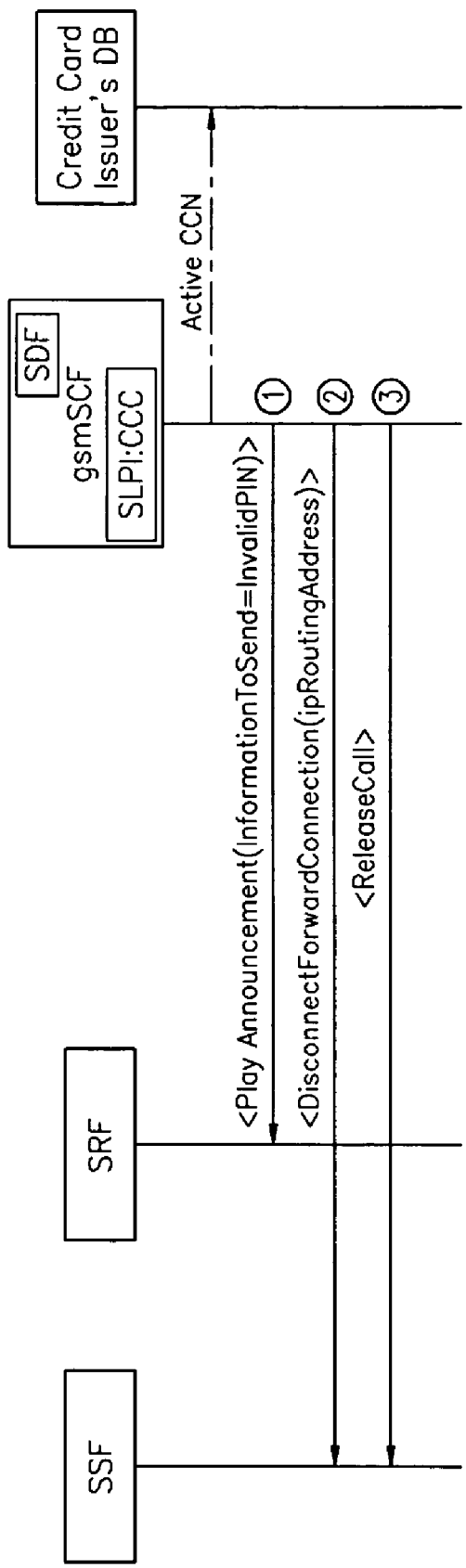

FIG. 13 illustrates a flow of messages exchanged between a gsmSCF, and an SSF that releases a call when a retry number of times to enter an invalid PIN exceeds a maximum allowed number of times to enter an invalid PIN. Referring to FIG. 13, when the retry number exceeds the maximum allowed number, an SPLI gives SRF, i.e., a calling party, an announcement informing this fact, indicated by an arrow ①. Next, the SLPI requests the SSF to disconnect a connection to the SRF, indicated by an arrow ②, and sends the SSF a ReleaseCall operation so as to terminate the CCC service, indicated by an arrow ③.

Figure 14:
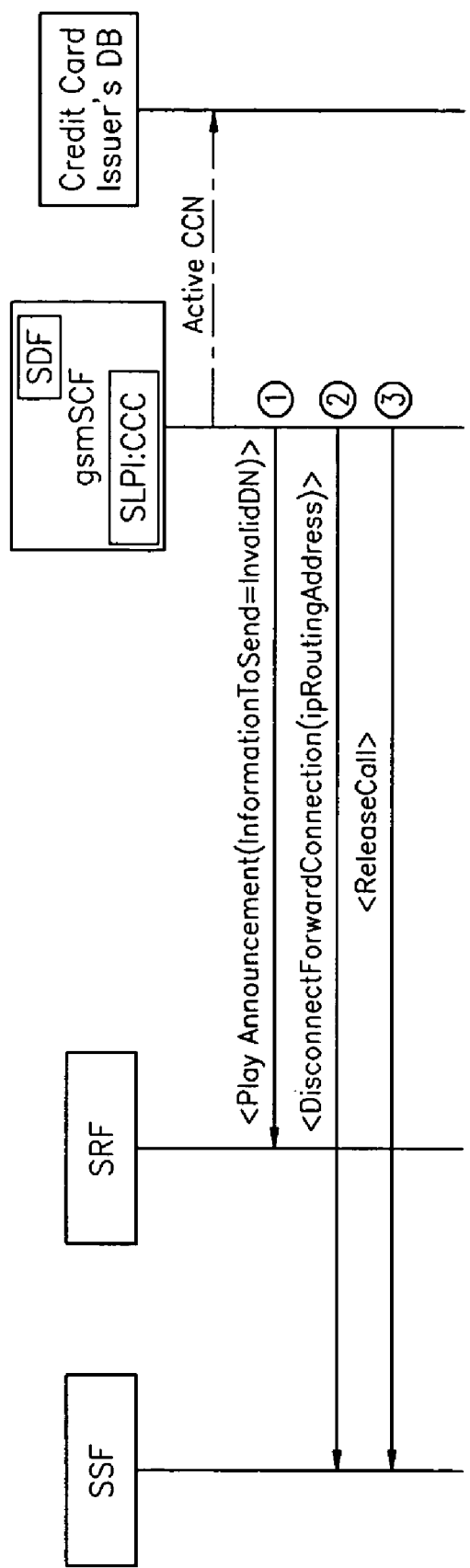

FIG. 14 illustrates a flow of messages exchanged between a gsmSCF, and an SSF that releases a call when a retry number of times to enter an invalid DN exceeds a maximum allowed number of times to enter an invalid DN. Referring to FIG. 14, when the retry number exceeds the maximum allowed number, an SLPI gives an SRF, i.e., a CCC service user, an announcement informing this fact, indicated by an arrow ①. Next, the SLPI requests the SSF to release a connection to the SRF, indicated by an arrow ② and sends the SSF a ReleaseCall operation so as to terminate the CCC service, indicated by an arrow ③.

Figure 15:
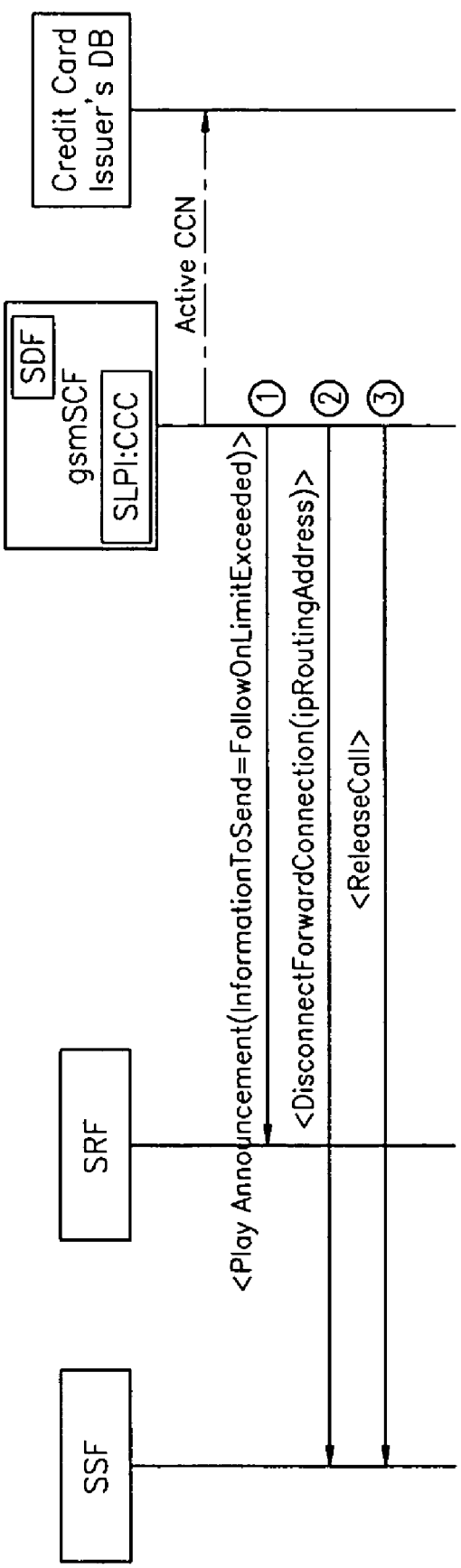

FIG. 15 illustrates a flow of messages exchanged between a gsmSCF, and an SSF that releases a call when a retry number of times to make a follow-on call exceeds a maximum allowed number of times to make a follow-on call. Referring to FIG. 15, when the retry number exceeds the maximum allowed number, an SLPI gives an SRF, i.e., a CCC service user, an announcement informing this fact, indicated by an arrow ①. Next, the SLPI request the SSF to disconnect a connection to the SRF, indicated by an arrow ②, and sends SSF a ReleaseCall operation so as to terminate a CCC service, indicated by an arrow ③.

As described above, the present invention defines a method of controlling a CCC service that has not yet been defined in the existing UMTS CAMEL structure. In other words, the present invention describes a connection between parties related to the CCC service and a service algorithm therefor, and further suggests a CCC service model. The CCC service model shows standards for details for connection between physical connection parties and between functional parties, and a connection to service logic. The CCC service model allows the CCC service to be more easily provided so that CCC service users can be given more differentiated, various features of the CCC service.

The present invention can be embodied as a computer readable code stored in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be distributed among computer systems that are interconnected through a network, and the present invention may be stored and implemented as a computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of providing a credit card calling (CCC) service in a customized applications for mobile networks enhanced logic (CAMEL)-based universal mobile telecommunication system, the method comprising:
   (a) a service switching function (SSF) receiving a service access code (SAC) and a credit card number (CCN) dialed by a CCC service user and sending an initial detection operation InitialDP to a global system for mobile communication (GSM) Service Control Function (gsmSCF);
   (b) a new dialogue initiates and a service logic program instance (SLPI) is invoked;
   (c) the SLPI requesting a connection between the gsmSCF and a specialized resource function (SRF);
   (d) the SLPI receiving a personal identification number (PIN) from the SRF;
   (e) the SLPI sending a search operation to a credit card issuer's database so as to receive information regarding whether the PIN is valid;
   (f) when the PIN is determined to be valid as a result of searching of the credit card issuer's database, the SLPI receiving a destination number from the SRF;
   (g) the SLPI requesting the SSF to send a report regarding a Basic Call State Model (BCSM) event;
   (h) the SSF arming event detection points (EDPs) in response to the request for the report regarding the BCSM event;
   (i) the SLPI requesting the SSF to disconnect a connection to the SRF in response to the arming of the EDPs;
   (j) the SLPI requesting the CCC service user who holds the destination number to make a call connection; and
   (k) when the SSF arms the EDPs indicating that a connection to the CCC service user or a called party is disconnected, the SLPI requesting the SSF to bill the CCC service user for the CCC service.

2. The method of claim 1, further comprising (l) after (k), making follow-on calls within a range of a predetermined number of times.

3. The method of claim 2, wherein the BCSM Event comprises:
   an O_Disconnect event in which a connection to a the CCC service user or the called party is disconnected;
   an O_Busy event in which the called party is busy on the telephone;
   an O_No_Answer event in which the called party does not answer; and
   an O_Route_Select_Failure event in which the called party is not positioned in a receiving area.

4. A computer readable recording medium encoded with computer program that executes the method of claim 1 in a computer.

* * * * *